United States Patent [19]

Khanna et al.

[11] Patent Number: 5,496,918
[45] Date of Patent: Mar. 5, 1996

[54] PROCESS FOR IMPROVING THE PROPERTIES OF POLYMERS

[75] Inventors: Yash P. Khanna, Cedar Knolls, N.J.; Kevin R. Slusarz, Greenwich, Conn.; Mina K. Gabriel, Whitehouse Sta, N.J.; Annemarie C. Reimschuessel, Morristown, N.J.; John P. Sibilia, Livingston, N.J.

[73] Assignee: AlliedSignal Inc., Morris Township, N.J.

[21] Appl. No.: 322,976

[22] Filed: Oct. 13, 1994

Related U.S. Application Data

[62] Division of Ser. No. 763,740, Sep. 23, 1991.
[51] Int. Cl.$^6$ ................................................ C08G 69/46
[52] U.S. Cl. ...................... 528/480; 528/323; 528/490; 528/503
[58] Field of Search .................................. 528/480, 490, 528/503, 322

[56] References Cited

U.S. PATENT DOCUMENTS

| | | |
|---|---|---|
| 2,855,377 | 10/1958 | Stott et al. |
| 3,080,345 | 3/1963 | Brooks et al. |
| 3,261,800 | 7/1966 | Collins, III . |
| 3,367,926 | 2/1968 | Vocks . |
| 3,367,936 | 2/1968 | Koppe et al. |
| 3,374,207 | 3/1968 | Ryffel et al. |
| 3,397,979 | 8/1963 | Reimchuessel . |
| 3,400,087 | 9/1968 | Robb et al. |
| 3,549,651 | 12/1970 | Oswald et al. |
| 3,639,659 | 2/1972 | Nieswandt et al. |
| 3,645,932 | 2/1929 | Harrison et al. |
| 3,755,402 | 8/1973 | Grigat et al. |
| 3,759,221 | 9/1973 | Bradford et al. |
| 3,867,339 | 2/1975 | Sanroma . |
| 3,905,946 | 9/1975 | Nieswandt et al. ............ 528/499 |
| 4,051,113 | 9/1977 | Kissel et al. |
| 4,110,303 | 8/1978 | Gergen et al. |
| 4,117,042 | 9/1978 | Couchoud . |
| 4,120,849 | 10/1978 | Breitschaft et al. |
| 4,133,802 | 1/1979 | Hachiboshi et al. |
| 4,157,360 | 6/1979 | Prevorsek et al. |
| 4,159,286 | 6/1979 | Khattab et al. |
| 4,195,161 | 3/1980 | Davis et al. |
| 4,200,707 | 4/1980 | Richardson . |
| 4,223,128 | 9/1980 | Halek et al. |
| 4,242,470 | 12/1980 | Gergen et al. |
| 4,368,182 | 1/1983 | Mills et al. |
| 4,386,182 | 5/1983 | Ziip . |
| 4,447,599 | 5/1984 | Cogswell et al. |
| 4,501,844 | 2/1985 | Chen et al. |
| 4,518,731 | 5/1985 | Zamboni et al. |
| 4,536,533 | 8/1985 | Chen et al. |
| 4,540,774 | 9/1985 | Gerking et al. |
| 4,560,734 | 12/1985 | Fujishita et al. |
| 4,799,736 | 1/1989 | Kassai . |
| 4,816,557 | 3/1989 | Pipper et al. |
| 4,963,650 | 10/1990 | Bokareva et al. |
| 4,978,743 | 12/1990 | Selbeck et al. .................. 528/499 |
| 5,324,816 | 6/1994 | Khanna et al. |

FOREIGN PATENT DOCUMENTS

| | | |
|---|---|---|
| 1694476 | 11/1970 | Germany . |
| 151317 | 10/1981 | Germany . |
| 4817552 | 6/1969 | Japan . |
| 52-105958 | 9/1977 | Japan . |
| 55-41623 | 10/1980 | Japan . |
| 1211689 | 11/1970 | United Kingdom . |

OTHER PUBLICATIONS

Gurato, et al., "Influence of Nucleating Agents on the Crystallization of 6–Polyamide", 179 Makromol. Chem, pp. 231–245 (1978).

Chatterjee, et al., "Heterogeneous Nucleation of Crystallization of High Polymers from the Melt", vol. 13(12), J. Polym. Sci., 2368–83 (Polym. Phys. Ed. 1975).

Koutsky, "Nucleation of Polymer Droplets", vol.38(4) J. Appl. Phys. pp. 1832–1839 (1967).

Y. P. Khanna, et al., "Memory Effects in Polymers. II. Processing History vs. Crystallization Rate of Nylong 6–Observation of Phenomenon and Product Behavior", vol. 28(24), Poly. Eng. and Sci., 1600–1606 (Dec. 1988).

English Abstract to DD 151,317 (Oct. 14, 1981).

English Abstract to JP 52 105958 (1977); (80–041623 (1980).

English Abstract to DE 1 694 476 (1970).

English Abstract to JP 73 017552 (1973); (JP44–50492; JP48–17552).

English translation of claims in Belgium 674170.

Khanna, et al., "Memory of Effects in Polymers III. Processing History vs. Crystallization Rate of Nylon 6–Commens on the Origin of Memory Effect", 28(24) Poly. Eng. and Sci 1607–1611 (1988).

English Abstract of Germany 103456.

Y. P. Khanna, et al. "Memory Effects in Polymers. IV. Processing History vs. Crystallization Rate–Effect of Polymer Structure", Poly, Eng. & Sci., Dec. 1988, vol. 28(24), pp. 1612–1615.

Ajji, A., et al. "Chain Entanglement and Viscoelastic Properties of Molten Polymers", Department of Chemical Engineering, Ecole Polytechnique, Jour. of Poly. Sci, Part B, Poly. Physics, vol. 24, 1983–1990 (1986).

A. Rudin, et al. "Shear Modification of Polymers", Poly. Eng. and Sci., Jun. 1983, vol. 23, No. 8, pp. 422–430.

R. Schertzer et al. "Shear and Thermal History Effects in Polypropylene Melts", Journal of Appl. Poly. Sci., vol. 31 (1986), pp. 809–821.

F. Rodriguez, *Principles of Polymer Systems*, pp. 144–148 (1970).

Primary Examiner—P. Hampton-Hightower
Attorney, Agent, or Firm—Michele G. Mangini

[57] ABSTRACT

This invention relates to a process of forming a polyamide composition having increased crystallization rate which comprises the steps of reducing the oligomeric polyamide content of said composition to less than 8% by weight of the composition, preferably with prior melt shearing, use of 1–2% nucleating filler e.g. talc and a mold release agent.

18 Claims, 2 Drawing Sheets

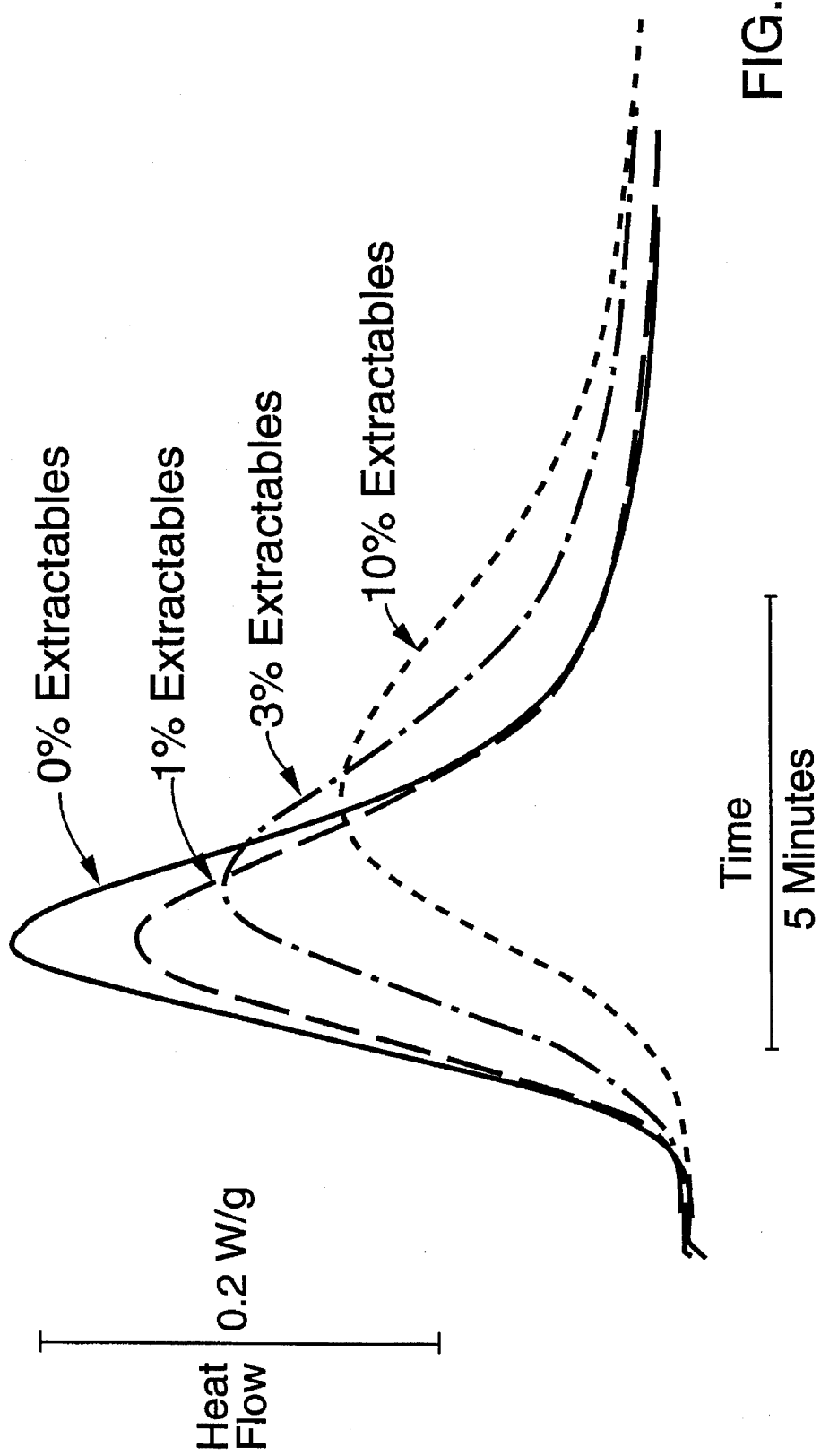

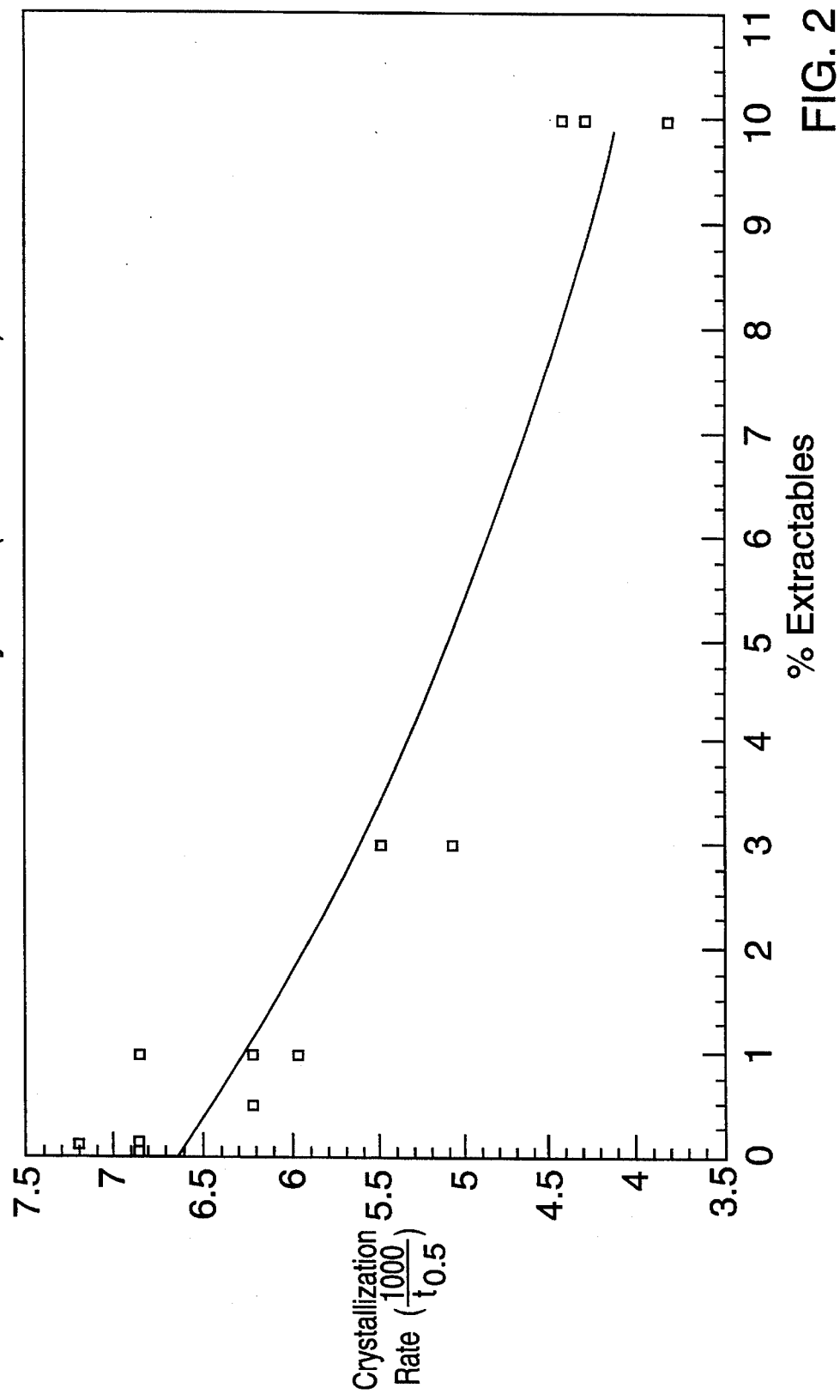

PROCESS FOR IMPROVING THE PROPERTIES OF POLYMERS

This application is a division of application Ser. No. 07/763,740, filed Sep. 23, 1991 (pending).

BACKGROUND OF THE INVENTION

1. Field of the Invention

This invention relates to a process for modifying polymers during and after fabrication. More particularly, this invention relates to a process for improving the thermal, optical and/or mechanical characteristics of polymers.

2. Prior Art

X-ray diffraction studies of synthetic linear is polyamides such as nylon 6 have shown that they may exist in one or more of several different crystalline forms. Structures which have been recognized include, in the case of nylon 6, the amorphous form, the pseudo hexagonal gamma-form, and the monoclinic alpha form.

The amorphous form of nylon 6 is obtained by rapid quenching of molten polymer to a temperature below the glass transition temperature of the nylon. Both the amorphous and gamma-forms are relatively unstable upon application of heat and moisture. Heating amorphous material to a temperature between approximately 55° C. and 150° C. results in at least a partial conversion of the amorphous form into the gamma-form. At temperatures above 150° C., a transition of the gamma-form into the alpha-form occurs. This monoclinic alpha structure represents a highly ordered crystalline form that is stable at temperatures up to the melting point of the nylon 6. It is the most desirable crystalline form from the standpoint of obtaining the optimum physical properties with nylon 6, including mold shrinkage and maximum dimensional stability.

The "super" or morphological structure in which the crystalline units are arranged also affects the physical properties of nylons. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material.

To obtain optimum physical properties in articles fabricated from nylon 6, it is desirable, therefore, to produce a highly crystalline material, crystallized predominantly in the stable alpha-form, with an extremely fine, dense and uniform morphological structure. Among the physical properties affected by increased crystallinity and improved morphological structure are abrasion resistance, heat distortion temperature, inherent stability or resistance to deformation, resistance to hot water, coefficient of expansion, hardness, yield, tensile strength and surface hardness.

Customary fabricating procedures used with nylon 6 such as injection molding, which include a rapid cooling from the melt, generally result in articles which contain the different crystalline structural forms to a varying degree depending upon the thermal history of the article.

It is known that a greater degree of crystallinity is obtained when polyamides are cooled extremely slowly from the melt; however, under these conditions, large spherulites develop which is not desirable. Moreover, the process is not economical. Crystallinity and the uniformity of the morphological structure can also be increased by annealing treatments after solidification. However, such practices are not economically feasible in ordinary industrial fabricating procedures as, for example, injection molding. More recently, investigators have found that bodies shaped from polyamides having a homogeneous and fine spherulitic structure can be obtained by addition to the polyamide melt of finely divided particles which act as crystallization nucleic (e.g., U.S. Pat. Nos. 2,855,377; 3,261,800 and 3,080,345; Belgian Patent 674,170; Japanese Patent Nos. 52-105958 and 80-041623, U.S. Pat. No. 4,501,844; Gurato, G. et al. "Influence of Nucleating Agents on the Crystallization of Nylon 6", *Makromol Chem.*, Vol. 179(1), pp. 231 to 245 (1978); Chatterjee, A.M., et al., "Heterogeneous Nucleation of Crystallization of High Polymers From the Melt", *J. Polym. Sci,. Polym. Phys. Ed.*, Vol. 13(12), pp. 2368–83 (1975); and Koutsky, J. A., "Nucleation of Polymer Droplets", *J. Appl. Phys., Vol.* 38(4), pp. 1832–39 (1967).

The function of nucleating agents when cooling semicrystalline polymers from the molten into the solid form is to increase the number of nuclei formed in a given time interval at a predetermined temperature. The final and over-all crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polyamide, i.e., they must reduce the time that is necessary under a given set of conditions for crystallization to start. This time is usually referred to as "induction time". Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 50° C. in nylon 6.

Other prior art describes other additives which can be used in addition to nucleating agents to enhance their effectiveness. For example, U.S. Pat. No. 3,549,651 discloses that the effectiveness of nucleating agents for linear polyamides in terms of the rate of crystallization into the desirable crystalline form can be increased by using a plasticizer in conjunction with the nucleating agent. U.S. Pat. No. 4,200,707 discloses the use of zinc phenyl phosphinate and zinc phenyl phosphate as nucleating agents for certain polyamides, and U.S. Pat. No. 3,867,339 describes polyamides containing sodium phenyl phosphinate and a calcium salt. U.S. Pat. No. 4,397,979 discloses that materials such as lithium metasilicate, lithium aluminate, lithium metaphosphate, lithium fluoride, magnesium fluoride, zirconium tetrafluoride, zirconium silicate and mixtures thereof. Great Britain Patent No. 1,211,689 and German Patent No. 1,694,476 disclose that substances such as calcium fluoride, molybdenum disulfide, lead tungstate, antimony trioxide, graphite, talcum and asbestos are effective nucleating agents. U.S. Pat. No. 4,159,286 discloses the use of polytetrafluoroethylene and at least one water insoluble organic salt or inorganic salt or oxide as the nucleating agent. U.S. Pat. No. 3,645,932 describes a process of developing rapidly the crystalline characteristics of certain polyamides by incorporation of a variety of nylon and other polyamide resins, polyethylene, polypropylene, polycarbonate and polyethylene acrylic acid copolymer ionomers. U.S. Pat. Nos. 4,536,533 and 4,501,844 disclose a rapidly crystallizable composition comprising (a) a linear polyamide selected from the series poly(4,4'-methylenediphenylene azelamide to dodecanediamide); and (b) an amount sufficient to promote the crystallization of the linear polyamide, of a material selected from the group of (I) talc, (II) sodium benzenesulfonate, (III) a polyethylene ionomer, (IV) a methacrylated butadiene-styrene, and (V) a multi-phase composite interpolymer. The compositions crystallize rapidly from the molten state which allows for economically attractive molding procedures including fiber production and the production of aromatic-aliphatic polyamides having a combination of excellent properties.

U.S. Pat. No. 3,400,087 discloses that the rate of crystal growth without substantial increase in the percent of total crystallization of polyamides is obtained by incorporating in the melt finely divided calcite particles and a fatty alcohol. DD Appln. No. 103,456 describes the use of nucleating agents for polyamides, especially tannin. Japanese Patent No. 73-017552 discloses a composition comprising a polyamide, e.g., nylon 6, 11, 12, 66, 610, etc.) and 0.01–3 wt % of a compound selected from As-oxide, Sb-oxide and Bi-oxide, talc and clay, and 0.01–3 wt % of either a polyvalent alcohol (e.g. trimethylolethane, trimethylolpropane, erythritol, sorbitol, amnnitol, etc.), or an aromatic ketone (e.g.) benzophenone, phenyl benzyl ketone, dibenzoyl, benzoyl methane, etc.).

U.S. Pat. No. 3,645,932 discloses nucleating agents selected from: (a) polymers and copolymers of monolefins, having from 2 to 6 carbon atoms the ionomer of ethylene-acrylic acid copolymer; (b) a polyamide of 1) epsilon-caprolactam, 20 omega-amino undecanoic acid, 3) omega-aminododecanoic acid, 4)hexamethylene diamine and adipic acid, 5) hexamethylene diamine and sebasic acid, or a copolyamide resin derived from polymeric fatty acids, sebasic acid and bisamino-ethylbenzene; (c) polycarbonate of p,p-isopropyliodenediphenol and phosgene; (d) polystyrene terpolymers of acrylonitrile, butadiene and styrene; (e) natural rubber, balata; and (f) paraffin wax, microcrystalline wax, are dispersed in an amount of 0.1–10 wt % in a crystalline polyamide derived from hydrogenated polymeric fatty acid, a coacid having from 6 to 10 carbon atoms and a diamine, and 25–75 wt % of the polyamide derived from the reaction product of the coacid and diamine.

U.S. Pat. No. 3,549,651 describes a solid synthetic linear polyamide composition having enhanced crystalline uniformity, the polyamide having dispersed in it about 0.10–5.0 weight percent of a finely divided nucleating agent selected from a group consisting of sodium phenyl phosphinate, sodium isobutyl phosphinate, silver bromide, molybdenum disulphide, boron nitride, the sodium complex of phthalocyanine and talcum, and from about 0.25–20 weight percent of a plasticizing agent selected from the group consisting of triethylene glycol, 2-ethyl-1,3 hexane-diol, tricresylphosphate, N-ethyl ortho- and para-toluene sulfonamide, and a mixture of N-ethyl and p-toluene sulfonamide.

U.S. Pat. No. 4,518,731 discloses that an adduct of aryl carboxylic or sulphonic acid and crystalline zeolite functions as a nucleating agent for crystalline polymers.

U.S. Pat. No. 3,367,936 describes a nucleating agent for crystalline copolymers selected from poly-alpha-olefins, thermoplastic polyesters, and polyamides, which comprises an adduct obtained by interaction of (a) an arylcarboxylic acid or sulphonic acid chosen from those which in the form of metal salts are known to exert a nucleating effect on the crystalline polymers of alpha-olefins, the acid having a melting point greater than the crystallization temperature of the polymer and being thermally stable at the maximum operational temperature in processing of the polymeric material, and (b) a crystalline aluminum silicate of an alkaline or alkaline earth metal of the zeolitic tectosilicate type, having a pore diameter of 3 Å–3 Å and a molar ratio $SiO_2/Al_2O_3=2-5$, in powder form, under such conditions that allow chemi-absorption of the acid (a) in component (b) such that 1–25 g (a) is present per 100 g (b) and (a) is partly bound to (b) by chemical bonds of polar type.

DD Patent No. 151,317 describes the fact that polymerization of alpha-crystalline Epsilon-polymerization shaped objects stabilized by additives involves the addition by weight of 0.01–0.2% CuCl 0.02–0.5% KBr, 0.2– 2.0% melamine, 0.01–0.5 (0.05–0.2)% talcum and 0.1–2.0% of a metal salt of a 12–20 carbon monocarboxylic acid (preferably 0.2–1.0 wt % calcium or zinc stearate) to the caprolactam, as well as any pigments, fillers or reinforcing agents that may be required. The additives serve to stabilize the product.

U.S. Pat. No. 3,759,221 describes a polyhexamethyleneadipamide composition which contains an inert nucleant, a specified alkylene diamide and a specified metal carboxylate. It is disclosed that this material is fast cycling.

U.S. Pat. No. 4,799,736 describes a crystalline polyamide composition having dispersed therein a nucleating agent composed of one or more partly divided inorganic materials, one or more fatty acid amides and one or more low molecular weight polymers selected from the group consisting of polyolefins, polyoxides and polysulfides. It is disclosed that the nucleating agent provides for a relatively homogeneous and fine spherulitic or crystal structure.

SUMMARY OF THE INVENTION

This invention relates to a process for decreasing the cycling times of polyamide compositions which comprises reducing the amount of oligomeric polyamides present in such composition to a concentration of less than 8% by weight of the composition. As used herein, "oligomeric polyamides" are polyamides having less than about seven, preferably less than about 5, and more preferably less than about 3 repeat amide units or less.

The concentration of the oligomeric polyamide is determined by solvent extraction, isolation of soluble oligomeric polyamide from the extraction solvent by high performance liquid chromatography (HPLC) using a suitable column, extraction of the oligomeric polyamide from the column dissolved in a suitable solvent and quantitative and qualitative analysis of the solution by uv spectrophotomer calibrated with the monomer precursor of the oligomeric polyamide. For example, in the case of nylon 6, the polyamide is extracted by refluxing water for 2 hours. The water extract is filtered and analyzed by high performance liquid chromatography (HPLC) using a silica gel column and water/acetonitrile as the mobile phase. Detection is acheived in the uv at 220 nm. Calibration is done with caprolactam.

An advantage of this invention is that the speed and efficiency of fabricating articles by the melt processing of polyamides is enhanced. Polyamides are normally processed by extrusion or injection moulding techniques, the latter being one of the main methods of fabricating discrete articles from polyamides. The injection moulding process consists essentially of softening the thermoplastic material in a heated cylinder, injecting it while molten under high pressure into a closed mould, cooling the mould to induce solidification, and ejecting the moulded article from the mould.

With a crystalline material like a polyamide, solidification in the mould to give a useful article is dependent on the crystallization of the material, and it has been proposed to prepare substantially stress-free moulded articles from a crystalliable plastics material by nucleating a melt of the plastics material with a small amount of a very finely and substantially uniformly divided salt or a saturated or unsaturated higher fatty acid. It has also been proposed to control the structural properties of polycaprolactam by polymerising monomeric caprolactam to which has been added an aqueous emulsion of a silicone oil or resin containing a precipitated inorganic salt, such as calcium fluoride.

The sequential operations involved in forming an article by injection moulding constitute an injection cycle, and, particularly where large numbers of moulded articles are to be fabricated by repetition of the injection cycle, it is desirable that the cycle time should be reduced to a minimum. Rate-controlling steps in the injection cycle are the time taken for the molten polyamide to flow into the mould, and the time for which the filled mould remains closed until the polyamide is sufficiently solidified to be removed from the mould without suffering deformation or other damage. By using a polyamide composition where the oligomeric polyamide content is less than 8% by weight of the composition, it has now been found that the length of these rate-controlling steps, and therefore of the total cycle time, can be reduced to considerably less than the cycle time for the same polyamide without the reduced oligomeric polyamide content.

BRIEF DESCRIPTION OF THE DRAWINGS

In the drawings:

FIG. 1 depicts differential scanning calorimetry (DSC) curves of heat flow verses time of nylon 6 pellets containing varying amounts of oligomeric polyamides showing the effect on crystallization time.

FIG. 2 is a graph of crystallization rate versus weight % of polyamides showing the effect of the concentration of oligomeric polyamide on the crystallization rate of nylon 6.

DESCRIPTION OF THE PREFERRED EMBODIMENTS

This invention includes one essential step of reducing the amount of oligomeric polyamide contained in a polyamide composition to an amount of less than 8% by weight of the composition. Polyamide compositions are formed by polymerization of an appropriate monomer, as for example an amino acid or a polymerizable derivative thereof or a combination of a diamine and a dicarboxylic acid. The polymerization is usually conducted for a time sufficient to form a polyamide composition comprising a polyamide having the desired molecular weight usually more than about 20,000 and preferably from about 20,000 to about 90,000. Invariably, the composition includes substantial amounts of oligomeric polyamide, usually more than about 8% by weight of the composition. In conventional processes, some oligomeric polyamide is removed, however; the amount is not reduced to less than about 8% by weight of the composition. While we do not wish to be bound by a theory, we believe that where the polyamide composition includes higher amounts of oligomeric polyamides (equal to or greater than 8% by weight of the composition), the crystallization the crystallization rate of the polyamide is increased. On reduction in the amount of oligomeric polyamides. This is beneficial during extrusion or injection moulding because faster crystallization rates allow for shorter cycle times for faster production.

In general, the amount of oligomeric polyamides is reduced to an amount less than about 8% by weight of the polyamide composition. In the preferred embodiments of the invention, the amount of oligomeric polyamides is reduced to an amount equal to or less than about 3% by weight of the polyamide composition in the more preferred embodiments of the invention is reduced to an amount equal to or less than about 2% by weight of the composition and in the most preferred embodiments of the invention is reduced to an amount of less than about 1% by weight of the composition. In the embodiments of choice, the concentration of oligomeric polyamide is reduced to an amount equal to or less than about 0.5% by weight of the composition, and at best equal to or less than about 0.1% by weight.

The amount of oligomeric polyamide in the polyamide may be reduced by any method capable of removing low molecular weight oligomeric polyamides from the polyamide composition. Illustrative of such useful procedures is solvent extraction. Typically, in such solvent extraction the polyamide composition is ground into a powder which is then extracted with an extraction solvent for the oligomeric polyamide and which is non-solvent for the polyamide. In the solvent extraction procedure, the polyamide is contacted with an appropriate solvent, preferably with agitation at elevated temperature (i.e. a temperature above room temperature and below the melting point of the polymer). Usually, extraction temperatures are from about 50° C. to about 175° C., preferably from about 50° C. to about 120° C., more preferably from about 80° C. to about 120° C. and most preferably from about 95° C. to about 100° C. In the embodiments of choice, the extraction temperature is the refluxing temperature of the solvent.

Solvents for use in solvent extraction may vary widely depending on the particular oligomeric polyamide and its solubility in a particular solvent. Usually, the oligomeric polyamide solvent is a solvent in which the monomer or monomers of the polyamide are soluble. Such solvents are well known in the art. These solvents, which include hot water, methanol and methylene chloride, will not be described herein in detail. Most useful extractive solvent for oligomeric nylon 6 is hot water. Useful extractive solvents for oligomeric nylon 66 are water, methanol, and methylene chloride.

Another useful technique for reducing the amount of oligomeric polyamides is extractive distillation. Such procedures are well known in the art and will not be described in any great detail. For example, a polyamide composition can be heated to a temperature above the melting point of the polyamide and the boiling point of the oligomeric polyamide at atmospheric pressure or at reduced pressure. In the preferred embodiments of the invention, the melt is at reduced pressure.

The polymers useful in the practice of this invention are those which contain amino and/or carboxylic acid terminal groups. Illustrative of polymers which may be utilized in the process of this invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

—NHCORCONHR¹— in which R is an alkylene group of at least two carbon atoms, preferably from about 2 to about 10; and $R^1$ is selected from R and phenyl groups. Also included are copolyamides and terpolyamides obtained by known methods, as for example, by condensation of hexamethylene daimine and a mixture of dibasic acids consisting of terephthalic acids and derivatives thereof, as for example, lactams. Polyamides of the above description are well known in the art and include, for example, the copolyamide of 30% hexamethylene diammonium isophthalate and 70% hexamethylene diammonium adipate, the copolyamide of up to 30% bis-(p-amidocyclohexyl)methylene, and terephthalic acid and caprolactam, poly(hexamethyleneadipamide) (nylon 66), poly(hexamethylene sebacamide) (nylon 6,10), poly(heptamethylene pimelamide) (nylon 7,7), poly(octamehylene suberamide) (nylon 8,8), poly(hexamethylene sebacamide) (nylon 6,10), poly(nonamethylene azelamide) (nylon 9,9), poly(decamethylene azelamide) (nylon 10,9), poly(decamethylene sebacamide (nylon 10,10), poly[bis(4-aminocyclohexyl)methane- 1,10-decanedicarboxamide] [(Quiana) (trans)], poly(m-xylylene adipamide), poly(p-xylylene sebacamide), poly(2,2,2-trimethylhexamethylene terephthalamide), poly(piperazine sebacamide), poly(methaphenylene isophthalamide) (Nomex), poly(p-phenylene terephthalamide) (Kevlar), polyhexamethylene isophthalamide, polyhexamethylene terephthalamide, or combinations thereof.

Other useful polymers are those formed by the polymerization of amino acids and derivations thereof, or for example, lactams. Illustrative of these useful polyamides are poly(4-aminobutyric acid), (nylon 4), poly( 6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amonodecanoic acid) (nylon 10), poly(11-aminoundecanoic acid) (nylon 11), poly(12-aminododecanoic acid) (nylon 12) and the like.

Preferred polyamides are poly(hexamethylene adipamide) (nylon 66) and poly(6-aminohexanoic acid) (nylon 6). The more preferred polyamide for use in the practice of this invention is poly(6-aminohexanoic acid) (nylon 6).

The polyamide composition may be used as prepared from the polymerization reactor or may be subjected to pre-processing before use. In the preferred embodiments of this invention, the polyamide is subjected to "an effective shear" in the melt prior to use. Methods of forming the melt may vary widely. The manner in which the melt is formed is not critical and any conventional method may be employed. Normally, the melt is formed by heating the polyamide to a temperature which is equal to or greater than the melting point of the polyamide. For example, a typical nylon 6 having a melting point at about 225° C. can be melted in an extruder at any temperature between about 225° C. and about 325° C. For nylon 6, a temperature preferably of about 250° C. to about 260° C. is normally employed. Thus, for every polyamide there is an optimum temperature for melting prior to subjecting the polyamide to an effective shear.

The melt is subjected to a shear having an "effective shear rate". As used herein, an "effective shear rate" is a shear rate [as shear rate is defined in Ferdinand Rodriguez, "Principles of Polymer Systems", McGraw-Hill Book Company, New York (1982)] which is effective to provide an improvement in the optical, crystalline and/or mechanical properties of the polymer to any extent. In the preferred embodiments of the invention, the shear rate is greater than about 100 $sec^{-1}$. In these preferred embodiments of the invention, the upper limit for the shear rate is not critical provided that the shear rate is not so high as to physically degrade the polymer. In the particularly preferred embodiments of the invention, the shear rate is from greater than about 100 $sec^{-1}$ to about 20,000 $sec^{-1}$, and in the most preferred embodiments of the invention the shear rate is from about 1000 $sec^{-1}$ to about 10,000 $sec^{-1}$.

Any method which can be used to shear a polymer melt or any liquid can be used. The method of choice is largely dictated by convenience. The shearing action can be provided by any appropriate method as for example by thermal shock, by pressure alteration, by ultrasonics or by mechanical means. Methods useful in shearing melts and liquids are known in the art, and will not be described in great detail. In one useful procedure, the polymer melt is sheared by thermal shock in which shearing is achieved by alternatively raising or lowering the temperature of the melt causing thermal expansions and resulting in internal stresses which cause the shear. In yet another useful procedure, the melt can be subjected to shear by electrical methods in which shear is achieved by high frequency electomagnetic waves impinging on the melt, and by electrical shock using waver amplitude and frequencies to cause shear. In still other procedures, shear is achieved by sudden pressure changes in pressure alteration methods; by ultrasonic techniques in which resonant vibrations which o causes portions of the melt to vibrate or to be excited at different frequencies and thus shear; and mechanical methods in which portions of the melt are caused to flow past other portions of the melt by use of mechanical means such as stirrers and extruders. These methods of shearing polymer melts are merely representative of useful methods, and any method known in the art for shearing a polymer melt or any liquid can be used.

In the preferred embodiments of the invention, mechanical shearing methods are employed such as by extrusion or injection molding. In the particularly preferred embodiments of the invention, shearing is achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone, etc.) are several variables which control the amount of shear to be applied.

In addition to the above-described essential components, the moulding composition of this invention can include various optional components which are additives commonly employed with polyamide resins. Such optional components include fillers, plasticizers, impace modifiers, chain extenders, colorants, mold release agents, antioxidants, ultra violet light stabilizers, nucleating agents, lubricants, antistatic agents, fire retardants, and the like. These optional components are well known to those of skill in the art, accordingly, only the preferred optional components will be described herein in detail.

While not critical, in the preferred embodiments of the invention, nucleating agents may be added to the melt. Useful nucleating agents may vary widely and can be any such material which is known for use in crystalline polymer as a nucleating agent. Illustrative of such materials are talc, mica, kaolin, asbestos, alumina, kaolinite, silica, silver bromide, graphite, molybdenum disulfide, lithium fluoride, sodium phenylphosphinate, sodium isobutylphosphinate, magnesium oxide, calcium oxide, calcium silicate, mercuric bromide, mercuric chloride, muskovite, cadmium acetate, lead acetate, silver chloride, and the like. Preferred for use in the practice of this invention are talc, mica, kaolin, and asbestos. Talc is most preferred for use in the practice of the invention.

The amount of nucleating agents may vary widely. In general, the amount of nucleating agent is equal to or less than about 5% by weight of the compositions. The amount of nucleating agent is preferably from about 0.01% to about 5% by weight of the composition, more preferably from about 0.01% to about 2% by weight of the composition and is most preferably from about 1% to about 2% by weight of the composition.

While not essential, a mould release agent may be added to the composition. Useful mould release agents may vary widely and any conventional agent may be used. Illustrative of useful mould release agents are poly(tetrafluoroethylene) waxes, salts of fatty acids such as zinc, sodium and aluminum stearate, polyethylene waxes, silicone waxes, and the like.

The amount of mould release agents used may vary widely, and conventional amounts of agents may be used. In general, the amount of mould release agents is from about 0.1 to about 5% by weight of the composition. Preferred amounts of mould release agents are from about 0.1 to about 2% by weight of the composition, more preferred amounts are from about 0.2 to about 1% by weight of the composition, and most preferred amounts are from about 0.5 to about 1.0% by weight of the composition.

The moulding composition of this invention preferably includes a fibrous or particulate filler, which functions to increase the modulus and stiffness of the composition, and provides a more economical composition. Any conventional fibrous or particulate filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like. Such fillers are well known materials and are readily available. The foregoing recited fillers are illustrative only and are not meant to limit the scope of the fillers that can be employed in this invention. In the preferred embodiments of this invention, fibrous materials such as fiber glass, carbon fibers, boron fibers and polymer fibers are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer component, and in the particularly preferred embodiment is in the range of from about 30 to about 90 wt % on the same basis.

While not essential, it may be desirable to include an optional plasticizer in the composition of this invention. The plasticizer allows crystallization of the amorphous areas of the composition to continue at lower temperatures than if a plasticizer is not used. This is particularly important in low temperature moulding. The plasticizers which can be used with the composition of the present invention are of the type known in the art as useful in linear polyamide molding compositions. Preferred plasticizers are those which are useful with polycaptolactam. Such useful plasticizer compositions are well known in the art and accordingly will not be described herein in detail.

The moulding composition of this invention can be further modified by the addition of one or more pigments. Illustrative of useful pigments are iron oxide, cadmium red, rhodamine, chrome yellow, chrome green, and pthalocyanine blue.

The moulding composition of this invention can be prepared by blending or mixing the essential ingredients, and other optional components, as uniformly as possible employing any conventional blending means. Appropriate blending means, such as melt extrusion, batch melting and the like, are well known in the art and will not be described herein in greater detail. In one useful procedure, the blending procedure can be carried out at elevated temperatures above the melting point of the polymer, and optional ingredients such as nucleating agents either preformed, or as individual components of the optional ingredients separately or as a combination of the components in a suitable form as for example, granules, pellets and preferably powders are added to the melt with vigorous stirring. Alternatively, all or a portion of the various components of the optional ingredients can be masterbatched or preblended with the polyamide in the melt and this premixed or masterbatch added to the polyamide in the melt in amounts sufficient to provide the desired amount of optional ingredients in the polyamide product. Stirring is continued until a homogeneous or substantially homogeneous composition is formed. The optional ingredients can also be added to the melt coated on the surface of small particles of inert powders which have a high surface volume ratios. The use of such inert powders, as for example, fused silica, fused alumina, carbon black and aerogels, and hydrogels of silica or alumina, helps to reduce the amount of optional ingredients required to provide optimum results. Accordingly, such powders will be employed in the conduct of the preferred embodiments of this invention. Blending temperatures and blending pressures, and the order of addition of the various components are not critical and may be varied as desired provided that a substantially homogeneous composition results. The blending procedure can be carried out at elevated temperatures, in which case the polymer component is melted and the solid nucleating agent and other optional ingredients are admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

The molding compositions according to the invention can be partially crystalline to amorphous, depending on which individual constituents are employed. They are thermoplastic materials from which moulded articles of manufacture having valuable properties can be produced by the conventional shaping processes, well known to those of skill in the art, such as melt spinning, casting, injection moulding and extruding. The process in general comprises the steps of forming a melt of the polyamide composition of this invention, placing the melted composition into a mould having the shape of the desired article and cooling the melted composition in the mould to induce solidification to form the moulded article having the shape of the mould. The composition of this invention is especially suited for use in injection moulding because of the relatively fast crystallization times. Such injection moulding comprises the steps of:

(a) Forming a melt comprising the polyamide composition of this invention;

(b) Injecting said melt in the melted state into a mould having the desired structural configuration to form a melted polyamide preform having the shape of said mould;

(c) Cooling said mould to induce solidification to form a moulded article having the shape of said preform; and (d) Ejecting the moulded article from said mould.

Also because of the relatively fast crystallization rate, the composition of this invention is also especially suited for use in conventional blow moulding procedures. Any conventional blow moulding procedures such as extrusion blow moulding, injection blow moulding, stretch blow moulding, multilayer blow moulding and the like can be used. For example, a simple extrusion blow moulding procedure can be used in which a parison (a round hollow tube is extruded from the molten polyamide mixture) which is entrapped between the two halves of a mould. The parison is expanded with gas pressure (usually 100 psi) usually provided by air or steam against the cavity of the mould to form the parts having the configuration of the mould. The blown part is then cooled, removed from the mould and excess flesh is trimmed from the part and reclaimed for further use.

Examples of such mouldings are components for technical equipment, apparatus castings, household equipment, sports equipment, components for the electrical and electronics industries and electrical insulations, car components, circuits, fibers, and semi-furnished products which can be shaped by machining. The use of the materials for coating articles by means of immersion or powder coating processes is also possible, as is their use as hot-melt adhesives. The moulding compositions according to the invention are outstandingly suitable for specific applications of all types since their spectrum of properties can be modified in the desired direction in manifold ways.

The moulding compositions according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example, based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films. The compositions of this invention are especially useful for fabrication of extruded films, as for example, films for use in food packaging. Such films can be fabricated using conventional film extrusion techniques.

The following examples are presented to more particularly illustrate the invention and should not be construed as limitations thereon.

EXAMPLE I

A. Experimental Procedure

1. Separation of Extractables.

Prior to extraction, nylon 6 pellets typically contain more than about 8% extractable oligomers. Nylon 6 oligomers were isolated by extraction of non-leached polymer after grinding into powder in refluxing water for two hours. The Water extract was filtered through 0.45 um filter and dried by rotoevaporation at about 60° C.

2. Preparation of Extractable Free Nylon 6 Pellets.

Several batches of 250 g of unleached nylon 6 pellets were extracted each in 400 ml of refluxing water for two hours. The water extract was filtered through 0.45 um filter and the pellets washed with fresh distilled water. The water extract was analyzed by HPLC for nylon 6 oligomers (monomer through heptamer). The extraction process was repeated several times until the water extract shows an oligomer level of 0.02% or less. Finally, the nylon 6 pellets were air dried for several hours in preparation for use in the following experiments.

3. Mixing of Extractables as Additive in Nylon 6.

About 1 gm of the extractable free nylon pellets were dissolved in 10 ml of trifluoroethanol solvent for about 4 hours at about 50° C. Solutions containing varying amounts of the extractables i.e. 0–10% were similarly prepared. The solution was then poured into a non-solvent and the contents boiled-off to recover the solution precipitated mixtures.

4. Differential Scanning Calorimetry.

A DuPont 9900 DSC operating in an argon atmosphere was used to measure the crystallization rate of nylon 6 as affected by the extractables content. About 10 mg. sample was crimped in an aluminum pan and heated at a rate of 20° C./min up to 280° C. and held there for 5 minutes. Then the sample was cooled rapidly to 200° C. and the isothermal crystallization observed. The crystallization rates are represented by crystallization rate maximum (W/g) as well as reciprocal peak width at half-height (e.g. $1000/t_{0.5}$).

B. Results

The results of the experiments are set forth in the following Table I, and in FIG. 1 and FIG. 2.

TABLE I

Effect of Extractables On The Crystallization Rate of Nylon 6 (Grade 8207)

| % Oligomeric Nylon 6 | Crystallization Rate Max.; Peek Height (W/g) | | Crystallization Rate $\left(\dfrac{1000}{t_{0.5}}\right)$ (sec$^{-1}$) | |
|---|---|---|---|---|
| 0.0% | 0.343 | 0.329 | 6.84 | 6.84 |
|  | 0.315 |  | 6.84 |  |
| 0.1% | 0.330 | 0.338 | 7.20 | 7.02 |
|  | 0.346 |  | 6.84 |  |
| 0.5% | 0.300 | 0.291 | 6.21 | 6.21 |
|  | 0.281 |  | 6.21 |  |
| 1.0% | 0.303 | 0.282 | 6.84 | 6.30 |
|  | 0.280 |  | 6.21 |  |
|  | 0.271 |  | 5.94 |  |
|  | 0.273 |  | 6.21 |  |
| 3.0% | 0.236 | 0.227 | 5.47 | 5.27 |
|  | 0.218 |  | 5.06 |  |
| 10.0% | 0.173 | 0.169 | 4.41 | 4.16 |
|  | 0.168 |  | 4.27 |  |
|  | 0.165 |  | 3.80 |  |

Data in Table I for a nylon 6 resin shows that as the extractables content increases, the overall crystallization rate decreases. FIG. 1 shows the negative impact of extractables on the crystallization rate of nylon 6 as revealed by differential scanning calorimetry (DSC). FIG. 2 and Table I demonstrate that the maximum crystallization rate is observed at an oligomeric polyamide concentration level of about 0.1%.

EXAMPLE II

Using the procedure of Example I, the effect of oligomeric nylon 6 on the crystallization rate of another nylon 6 resin was evaluated. The results of this evaluation are set forth in the following Table II.

TABLE II

Effect of Extractables On The Crystallization Rate of Nylon 6 (Grade MBM-U)

| % Oligomeric Nylon 6 | Crystallization Rate Max.; Peek Height (W/g) | | Crystallization Rate $\left(\dfrac{1000}{t_{0.5}}\right)$ (sec$^{-1}$) | |
|---|---|---|---|---|
| 0.0% | 0.220 | 0.245 | 5.26 | 5.80 |
|  | 0.270 |  | 6.21 |  |
|  | 0.245 |  | 5.94 |  |
| 2.88% | 0.174 | 0.205 | 3.69 | 4.34 |
|  | 0.235 |  | 5.06 |  |
|  | 0.206 |  | 4.27 |  |

Data in Table II shows that the overall crystallization rate of the nylon 6 decreases at higher extractables content.

What is claimed is:

1. A process for increasing the crystallization rate of a polyamide composition comprising:
   (a) shearing a melt of said polyamide composition at an effective shear rate; and
   (b) reducing the total amount of oligomeric polyamides in said polyamide composition to less than about 3% by weight of said composition, wherein said oligomeric polyamides includes the total amount of polyamide polymers having from one to seven monomer units.

2. The process of claim 1 wherein the amount of oligomeric polyamides is less than about 2% by weight.

3. The process of claim 2 wherein said amount of oligomeric polyamides is equal to or less than about 0.5% by weight.

4. The process of claim 3 wherein said amount of oligomeric polyamides is equal to or less than about 1% by weight.

5. The process of claim 1 wherein the amount of oligomeric polyamides is equal to or less than about 0.1% by weight.

6. The process of claim 5 wherein said polyamide is selected from the group consisting of nylon 6 and nylon 66.

7. The process of claim 6 wherein said polyamide is nylon 6.

8. The process of claim 1 wherein the amount of oligomeric polyamide is reduced by solvent extraction.

9. The process of claim 8 wherein said solvent extraction is carried out at elevated temperatures.

10. The process of claim 9 wherein said polyamide is selected from the group consisting of nylon 6 and nylon 66 and wherein the amount of oligomeric polyamide is equal to or less than about 3% by weight.

11. The process of claim 10 wherein said extracting solvent is water.

12. The process of claim 11 wherein said extraction is carried out under reflux conditions.

13. The process of claim 12 wherein said polyamide is nylon 6.

14. The process of claim 13 wherein said melt is subjected to a shear by mechanical means.

15. The process of claim 14 wherein said melt is subjected to a shear by extruding said melt through an extruder at a temperature equal to or greater than the melting point of said polyamide composition.

16. The process of claim 15 wherein said shear rate is greater than about 100 sec$^{-1}$.

17. The process of claim 16 wherein said shear rate is from greater than about 100 sec$^{-1}$ to about 20,000 sec$^{-1}$.

18. The process of claim 17 wherein said shear rate is from greater than about 100 sec$^{-1}$ to about 10,000 sec$^{-1}$.

\* \* \* \* \*